(12) United States Patent
Ailenei

(10) Patent No.: US 9,537,316 B2
(45) Date of Patent: Jan. 3, 2017

(54) POWER MANAGEMENT CIRCUIT FOR A MULTI-PHASE POWER SUPPLY

(71) Applicant: Tundra Process Solutions Ltd., Calgary (CA)

(72) Inventor: Gheorghe Ailenei, Airdrie (CA)

(73) Assignee: Tundra Process Solutions Ltd., Calgary (CA)

(*) Notice: Subject to any disclaimer, the term of this patent is extended or adjusted under 35 U.S.C. 154(b) by 148 days.

(21) Appl. No.: 14/574,584

(22) Filed: Dec. 18, 2014

(65) Prior Publication Data

US 2016/0181936 A1 Jun. 23, 2016

(51) Int. Cl.
*H01H 83/00* (2006.01)
*H02J 3/00* (2006.01)

(52) U.S. Cl.
CPC .................................. *H02J 3/006* (2013.01)

(58) Field of Classification Search
CPC .................................. H02J 3/005; H02J 3/006
See application file for complete search history.

(56) References Cited

U.S. PATENT DOCUMENTS

| | | | |
|---|---|---|---|
| 3,600,597 A * | 8/1971 | Swerdlow | H01F 30/10 307/17 |
| 4,060,843 A | 11/1977 | Bost | |
| 5,070,252 A * | 12/1991 | Castenschiold | H01H 71/002 307/113 |
| 7,064,458 B2 * | 6/2006 | Wittner | H02J 3/005 307/43 |
| 2006/0071554 A1 * | 4/2006 | McNamara | H02J 3/005 307/10.1 |

* cited by examiner

*Primary Examiner* — Daniel Cavallari
(74) *Attorney, Agent, or Firm* — Parlee McLaws LLP (CGY); Sean Goodwin

(57) ABSTRACT

A power management circuit for a multi-phase alternating current (AC) power supply is provided to manage a single phase bad, connected thereto, during a brownout condition. The management circuit is configured to switch the single phase electrical bad from an affected conductor of the AC power supply and to connect the single phase electrical bad between two unaffected conductors of the AC power supply thereby ensuring continued supply of voltage to the single phase electrical load.

13 Claims, 9 Drawing Sheets

| L1 | L2 | L3 | R1/S1 | R2/S2 | R3/S3 | C21/C23 | C31/C32 |
|---|---|---|---|---|---|---|---|
| 1 | 1 | 1 | 1 | 0 | 0 | 0 | 0 |
| 0 | 1 | 1 | 0 | 1 | 0 | 1 | 0 |
| 1 | 1 | 0 | 0 | 0 | 1 | 0 | 1 |

Energized/Active - 1
De-energized/De-active - 0

*Fig. 7*

POWER MANAGEMENT CIRCUIT FOR A MULTI-PHASE POWER SUPPLY

FIELD

Embodiments described herein relate to a power management circuit for a multi-phase power supply, and more particularly, is a power restoration circuit for single phase electrical load(s) driven by a three phase alternating current (AC) power supply after loss of a single phase such as during brownout conditions.

BACKGROUND

A multi-phase AC power supply system, for example, a three phase AC power supply system typically has three hot or high voltage conductors and a neutral. Three phase power supply systems are used to drive a variety of electrical loads including single phase and three phase electrical loads. Typically, single phase electrical loads are connected across any two active or hot conductors. For a single phase load to function, as desired, it is essential that there be current flowing through both the hot conductors connected to the single phase load.

A brownout condition is an intentional or unintentional drop in voltage in an electrical power supply system. In a three phase AC power supply system, during a brownout condition, only two of the three hot conductors are live or active. In other words, current is available only in two of the hot conductors. If the single phase load happens to be connected to one of the conductors through which there is no current flow, no voltage is supplied thereto which causes the single phase load to malfunction or stop functioning altogether. A brownout condition is different from a blackout or power loss condition. In a blackout condition, current is not available on two or more of the hot conductors and subsequently no voltage is supplied to any single phase electrical load connected thereto. In both instances, the single phase electrical load either malfunctions or stops working.

A brownout typically occurs due to fluctuations or disruptions in the power distribution grid due to environmental interruptions such as storms or insufficient power being generated at a power generation facility. Other environmental conditions such as excessive humidity may also trigger a brownout or under voltage condition. Local and excessive humidity may cause condensation within an electrical panel receiving the three phase AC power supply conductors, leading to a short circuit of a phase which results in lowered voltages being supplied to the electrical loads. Therefore, electrical systems installed in humid areas tend to suffer from such unpredicted or unscheduled brownout conditions on a fairly regular basis.

A brownout condition does not adversely affect three phase loads in that three phase loads do not stop functioning altogether during a brownout condition. A three phase load such as an electric motor will not stop working during a brownout condition. A three phase motor compensates for the loss of current in one of the active conductors connected thereto. Optimal functioning of the motor, during a brownout condition, may be achieved by employing a variable frequency drive (VFD).

It is also known to connect the single phase electrical load between a hot conductor and a neutral of the AC power supply. Problems associated with brownout and blackout conditions described above are encountered in this configuration too.

However, as stated earlier, brownout conditions can be particularly hazardous to the health of the single phase load. For example, if a brownout or power interruption occurs in an electrical system serving, or driving, single phase loads such as ultraviolet (UV) lamps or light emitting diodes (LEDs) and three phase loads such as an electric motor, the single phase loads will stop working or may even fail during the brownout condition. Motors may continue to work at reduced and detrimental speeds if connected to the electrical system through a VFD. Premature mortality of single phase electrical loads during brownout conditions can increase maintenance costs. Stoppage of the single phase electrical loads can inconvenience operating personnel. For example, stoppage of single phase lighting in a control room housing various control modules, during a brownout, can prevent personnel from accessing the various control modules thereby increasing downtime and decreasing efficiency.

In light of the foregoing, a need exists for a reliable system or circuit that can accommodate brownout conditions by continuing to supply standard or normal operating voltages to all single phase electrical loads connected to a three phase AC power supply at all times.

SUMMARY

Herein, the term "conductor" is used interchangeably with "supply line". The conductor may be a hot conductor or high voltage conductor or may be a neutral conductor or a cold conductor.

As used herein, an "active or live conductor" means a conductor through which current flow exists. An "inactive conductor" means a conductor through which no current flow exists.

Embodiments described herein relate to a power management circuit which causes switching of a single phase electrical load, connected across two supply lines or conductors of an AC power supply, for establishing an alternate electrical path between the AC power supply and the single phase load to ensure current flow to the single phase load at all times including during brownout or undervoltage conditions. The circuit described herein ensures that all the single phase loads driven by the power supply remain connected to two live or active hot conductors of the AC power supply at all times.

All embodiments described herein disclose the single phase load as being connected between two hot conductors of the AC power supply. During a brownout condition, if there is no current flow through one of the hot conductors connected to the load, the system described herein senses the change in condition and establishes an alternate electrical path between the affected load and any two remaining live hot conductors of the AC power supply, thereby preventing the load from stopping or failing. In other words, within moments, normal power-up state is restored to the affected single phase electrical load. Power restoration, carried out by the system described herein, is generally instantaneous causing minimal interruption to the working of the electrical single phase electrical load.

Accordingly in one broad aspect a power management circuit is provided. The power management circuit is connected between a three phase alternating current (AC) power supply having at least three conductors and a single phase electrical load. The single phase electrical load is connected to two of the at least three conductors establishing a first electrical path between the single phase electrical load and the AC power supply. The management circuit comprises a first load switching module connected between the single phase electrical load and a first and a third conductor. The management circuit also comprises a second load switching module connected between the single phase electrical load and the third and a second conductor. Further, the management circuit comprises a third load switching module connected between the single phase electrical load and the first and the second conductor. The management circuit also comprises a control module operatively coupled to the first, second and third load switching module and to the first, second and third conductors. The control module is sensitive to a change in a condition in any one of the first, second and third conductors and energizes the single phase electrical load by establishing an alternate electrical path between the single phase electrical load and the AC power supply through any other of the first, second or third conductors through the respective first, second or third load switching modules.

In one embodiment, the first, second and third conductors are high voltage conductors and the single phase electrical load is connected across the first and third high voltage conductors. In this embodiment, the control module comprises three relays for controlling three load switching modules. A first relay connected to the first and third conductors and to the first load switching module. A second relay connected to the third and second conductors and to the second load switching module. A third relay connected to the first and second conductors and to the third load switching module. If there is current flow in the first, second and third conductors, the first relay is activated to close the first load switching module and open the second and third load switching modules to energize the single phase electrical load through the first load switching module. If there is current flow in the third and second conductors and no current flow in the first conductor, the first relay is de-activated to open the first load switching module, the third load switching module remains open, the second relay is activated to close the second load switching module to energize the single phase electrical load through the second load switching module. If there is current flow in the first and second conductors and no current flow in the third conductor, the first relay is de-activated to open the first load switching module, the second load switching module remains open, the third relay is activated to close the third load switching module to energize the single phase electrical load through the third load switching module.

A power management circuit is provided. The management circuit is connected between an alternating current (AC) power supply and a single phase electrical load. The management circuit comprises a first relay connected to a first hot conductor and a third hot conductor of the AC power supply and to the single phase electrical load through a first load switching module. A second relay connected to the third hot conductor and a second hot conductor of the AC power supply and to the single phase electrical load through a second load switching module. A third relay connected to the first hot conductor and the second hot conductor and to the single phase electrical load through a third load switching module. The first relay is electrically coupled to a first normally closed relay contact associated with each of the second and third relays. The second relay is electrically coupled to a second normally closed relay contact associated with the third relay. The third relay is electrically coupled to a second normally closed relay contact associated with the second relay. During operation, if there is current flow in the first, second and third hot conductors, the first relay is activated to close the first load switching module and opens the first normally closed relay contacts of the second and third relays to open the second and third load switching modules for establishing a first electrical path to the single phase electrical load through the first load switching module. If there is no current flow in the first hot conductor and there is current flow in the third and second hot conductors, the second relay is activated to close the second load switching module and establish a second electrical path to the electrical load through the second load switching module, absence of current flow in the first hot conductor fails to activate the first and third relays connected to the first hot conductor. If there is no current flow in the third hot conductor and there is current flow in the first and second hot conductors, the third relay is activated to close the third load switching module and establish a third electrical path to the electrical load through the third load switching module, absence of current flow in the third hot conductor fails to activate the first and second relays connected to the third hot conductor.

BRIEF DESCRIPTION OF THE DRAWINGS

FIG. 7 is a truth table illustrating various outputs of the management circuit shown in FIG. 2 given various inputs.

DETAILED DESCRIPTION

The power management circuit described herein relates to use in an AC power supply system. In the embodiments described herein, a single phase load is connected between two hot conductors of the AC power supply system. However, a person of skill in the art will understand that the single phase load may be connected between one hot conductor and the neutral or cold conductor as detailed in some of the embodiments.

The problem of brownout on single phase electrical loads is addressed by switching a single phase electrical load connected between an active hot conductor and an inactive hot conductor, of an AC power supply, to two active hot conductors of the AC power supply. Switching establishes an alternate electrical path between the load and the AC power supply through two unaffected hot conductors for generally continuous powering of the load.

Figure 1:
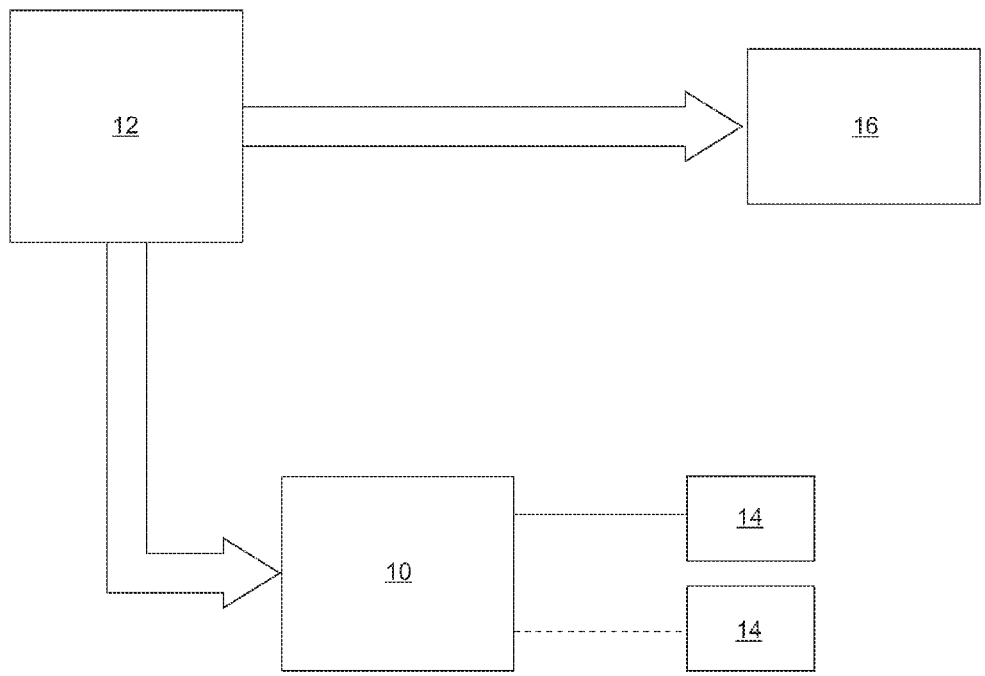
FIG. 1 is a schematic illustrating arrangement of a single phase management circuit in an AC electrical power system.

FIG. 1 illustrates a power management circuit 10 performing the above-stated operation and its location in an AC power supply system 100. As shown in FIG. 1, the management circuit 10 is connected between a three phase AC power supply 12 and one or more single phase electrical loads 14 such as a light. The AC power supply 12 may also power or drive one or more three phase electrical loads 16 such as an electric motor.

Figure 2:
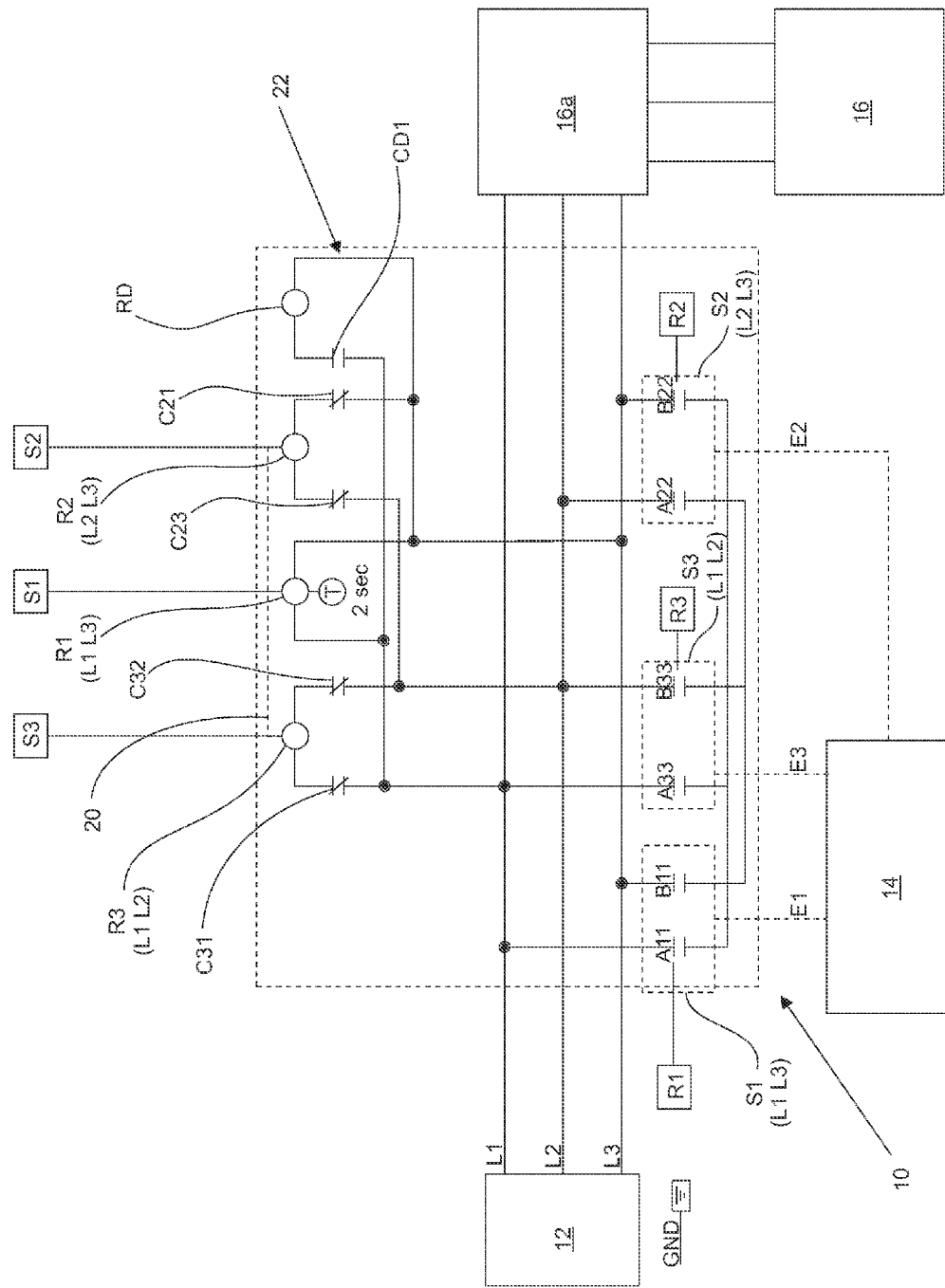
FIG. 2 is an electrical diagram illustrating an embodiment of the management circuit of FIG. 1, as applied to a three phase AC power supply and a single phase electrical load, the AC power supply having three hot conductors and the single phase electrical load being normally connected between a first hot conductor and a third hot conductor.

FIG. 2 illustrates in detail the various components of the power management circuit 10 and its connection to the AC power supply 12 and to one single phase load 14. In the embodiment illustrated in FIG. 2, the AC power supply 12 has three hot or high voltage conductors L1, L2 and L3. Each high voltage conductor carries one phase of the AC power supply 12. The currents of the three phases vary sinusoidally and are displaced in phase by 120°.

In one embodiment and as illustrated in FIG. 2, the single phase load 14 is connected between hot conductors L1 and L3. In this embodiment, the three phase load 16 is an electric motor which is connected to the AC power supply 12 through a variable frequency drive (VFD) 16a. The AC power supply 12 described herein has an output voltage that may vary from 200-600 VAC, and typically may vary in frequency, sometimes between 48 Hz and 62 Hz. However, the management circuit 10 is not limited to use with any specific input voltage or frequency of the AC power supply 12.

At a higher level, the management circuit 10 senses a change in condition in the high voltage conductors, L1 and L3, powering the single phase load 14. In this embodiment, the change in condition is presence or absence of current in L1 and L3. If there is no current flow through either of L1 or L3 i.e. if L1 or L3 are de-active, the management circuit establishes an alternate connection between the AC power supply system 12 and the single phase load through the unaffected hot conductor (L1 or L3) and the other hot conductor L2 of the AC power supply system 12. The following paragraphs explain in the detail the configuration of the management circuit 10 and its interaction with the single phase load 14 and the AC power supply 12 during normal and brownout conditions.

Still referring to FIG. 2, the management circuit 10 further comprises three load switching modules S1, S2 and S3 and a control module 18 for controlling S1, S2 and S3. Control module 18 controls opening and closing of S1, S2 and S3 for forming an electrical path between the AC power supply system 12 and the single phase load 14 through either one of S1, S2 or S3 for energizing the single phase load 14.

In one embodiment, each load switching module S1, S2 and S3 has two normally open switches A11, B11; A22, B22 and A33, B33, respectively. S1 is connected to hot conductors L1 and L3 through A11 and B11. S2 is connected to hot conductors L2 and L3 through A22 and B22. S3 is connected to hot conductors L1 and L2 through A33 and B33.

In one embodiment and as illustrated in FIGS. 2 to 6, the control module 18 comprises three relays R1, R2 and R3. Relay R1 is operatively coupled to S1 and to hot conductors L1 and L3. Relay R2 is operatively coupled to S2 and to hot conductors L2 and L3. Relay R3 is operatively coupled to S3 and to hot conductors L1 and L2. A person skilled in the art will understand that the management circuit 10 described herein may also include as current limiting devices conventional circuit breakers or fuses associated with the conductors and the relays.

In one embodiment and as illustrated in FIGS. 2 to 6, the management circuit 10 further comprises an interlocking means or interlock 20 connected between relays R1, R2 and R3 for preventing simultaneous operation or energization of relays R1, R2 and R3 during an operation cycle. The interlock 20 only allows activation or energization of only one of either R1, R2 or R3 and subsequently closing of only one of the switching module, namely S1, S2 or S3. In one embodiment, the interlocking means 20 comprises two normally closed relay contacts associated with relays R2 and R3 being controlled by R1 and either R2 or R3.

In detail and as illustrated in FIGS. 2 to 6, relay R2 has two normally closed relay contacts C21 and C23 associated therewith. Relay contact C21 is controlled by R1 and relay contact C23 is controlled by R3. R3 also has two normally closed relay contacts C31 and C32 associated therewith. Relay contact C31 is controlled by R1 and relay contact C32 is controlled by R2.

In one embodiment, the management circuit 10 further comprises a delay circuit 22 which introduces a prescribed delay time between opening and closing of A11 and B11 i.e. switching ON and OFF of S1 after a brownout condition occurs. The momentary time delay introduced by the delay circuit 22 allows dissipation of the low power signal introduced on L1 or L3 during the brownout condition. In one embodiment and as illustrated in FIGS. 2 to 6, the delay circuit 22 is an electro-mechanical delay circuit comprising a relay RD and an associated normally open relay contact CD1. In these embodiments, R1 is connected to S1 through the delay circuit 22. The delay circuit 22 comes into play only after a brownout condition has passed. In other words, after current supply in either L1 or L3 has been restored.

Figure 3A:
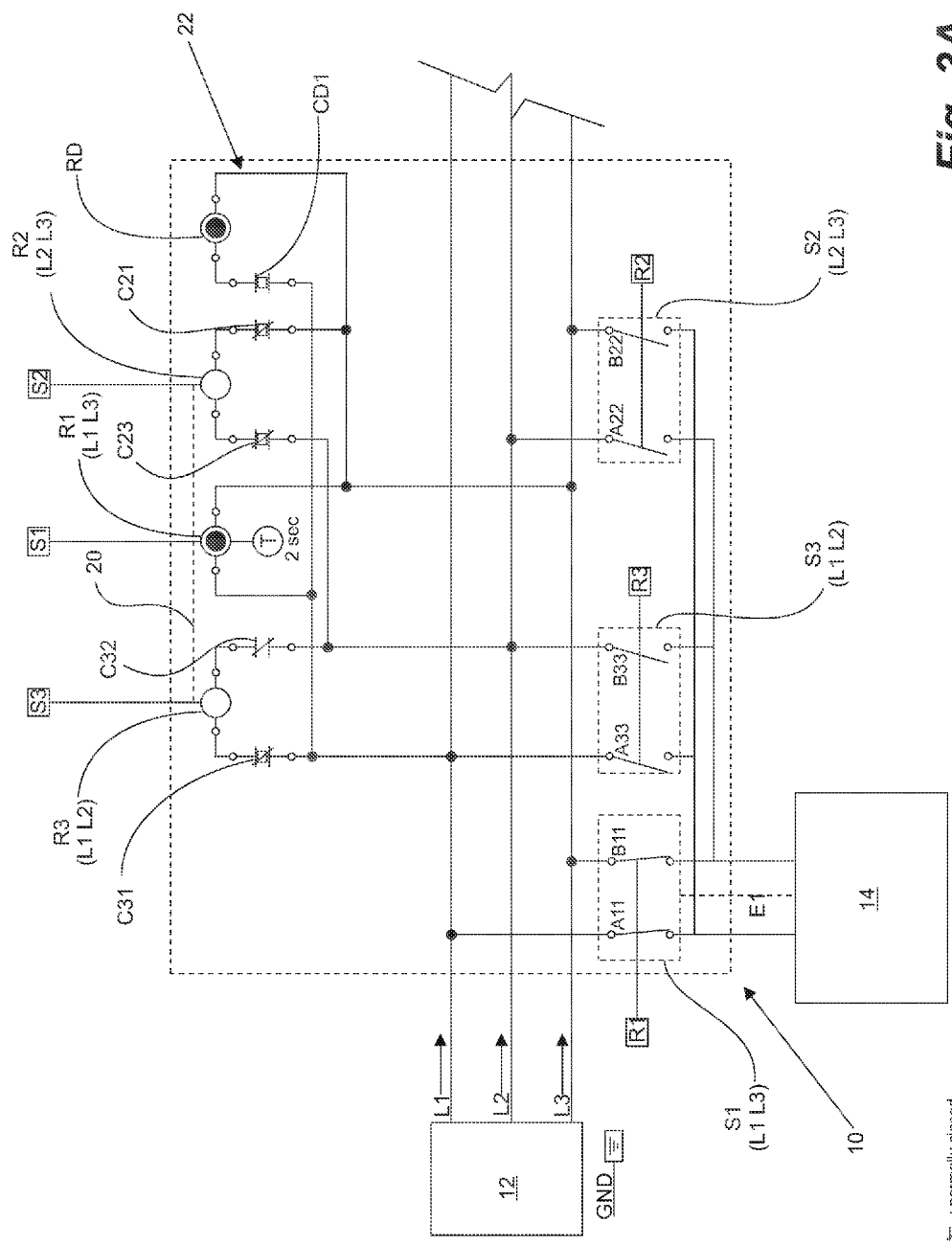
FIG. 3A is schematic electrical diagram of the management circuit of FIG. 2 illustrating status of the various electrical components thereof when there is normal current flow through all three hot conductors of the AC power supply, in other words, when all three hot conductors are active, the single phase load normally powered through L1 and L3.
Figure 3B:
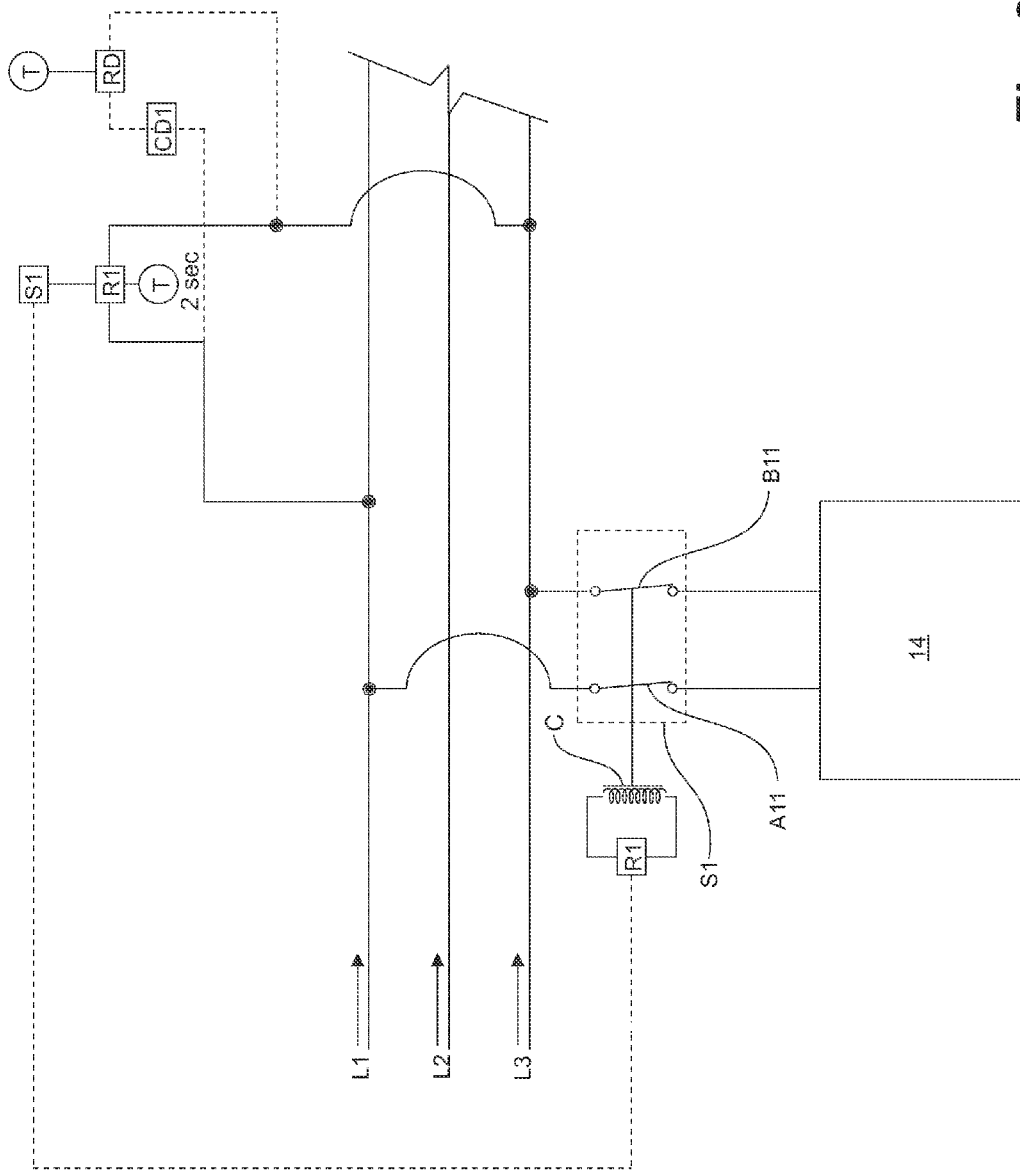
FIG. 3B is a subset of the management circuit shown in FIG. 3A illustrating in detail the components and interconnections of one load switching module and associated relay, namely R1 and S1.

FIG. 3B illustrates the various interconnections between the management circuit 10 and the AC power supply 10 and the single phase load 14 with respect to a single switching module namely S1 and its associated relay R1. As shown in FIG. 3B, switching module S1 is controlled by R1. S1 and R1 are connected to L1 and L3. A person of skill in the art will understand that presence or absence of current in L1 and L3 will cause coil C of R1 to energize or de-energize resulting in opening or closing of A11 and B11 of S1 for forming or opening an electrical path between the AC power supply 12 and the single phase load 14.

The management circuit 10 illustrated in FIGS. 1 to 6 primarily functions as a power restoration circuit during an undervoltage or brownout condition. During a brownout condition, either of the hot conductors L1 or L3 connected to the load 14 becomes inactive thereby reducing the voltage being supplied to the load 14. Reduction in voltage may lead to stopping or failure of the load 14. The management circuit 10 illustrated in FIGS. 1 to 6 ensures that voltage being supplied to the load 14 is always above a certain predetermined threshold even in the absence of current flow through either L1 or L3. The management circuit 10 switches the load 14 connected across L1 and L3 to L1 and L2 if L3 becomes inactive, or to L3 and L2 if L1 becomes inactive. Once the brownout condition has passed, the management circuit 10 switches the load 14 back to between L1 and L3. The delay circuit 22 ensures that closing of A11 and B11 associated with S1 is not instantaneous. In one embodiment, the delay circuit introduces a delay of two seconds before closing of A11 and B11 after R1 has energized.

The following paragraphs described in detail functioning of the management circuit during a brownout or undervoltage condition.

Normal Operation (L1, L2 and L3 are all Active)

As shown in FIG. 3, during normal operation current flows through each of L1, L2 and L3. In other words, L1, L2 and L3 are all live or active. In this condition, since there is current flow through all of L1, L2 and L3, relays R1, R2 and R3 will start energizing. However, energization of relays R1, R2 and R3 does not close S2 and S3 connected to R2 and R3. Only R1 maintains its energized state for closing normally open switches A11 and B11 of S1. Subsequently, only S1 is closed thereby establishing a first electrical path E1 between the AC power supply 12 and the load 14 through the closed S1. The interlocking means 20 ensures that even though relays R2 and R3 are energized before relay R1, only relay R1 is allowed to sustain its energized state thereby enabling closing of S1 associated therewith.

Closing of S1 is achieved as follows: Since L1, L2 and L3 are all active, all the three relays R1, R2 and R3 will start energizing. If during the power signal cycle, if relay R1 is fully energized before relays R2 and R3, relay R1 will open normally closed contacts C21 and C31 of relays R2 and R3, respectively. This will stop energization of relays R2 and R3. If during the power signal cycle, if relay R2 is fully energized before relays R1 and R3, relay contacts C21 and C23 of R2 will open thereby not allowing flow of current through S2. Further, energization of R2 will also open relay contact C32 of relay R3 causing energization of R3 to stop. R1 continues to energize and close switches A11 and B11 of S1 for establishing the first electrical path E1 between the AC power supply 12 and the load 14.

If during the power signal cycle, if relay R3 is fully energized before relays R1 and R2, relay contacts of C31 and C32 of relay R3 will open thereby not allowing flow of current through S3 being controlled by R3. Further, energization of R3 will also open relay contact C23 of relay R2 causing energization of R2 to stop. R1 continues to energize and close switches A11 and B11 of S1 for establishing the first electrical path E1 between the AC power supply 12 and the load 14.

Flow of current through the first electrical path E1 causes energization of load 14.

A brownout condition occurs when current flow through either of L1 or L3 connected to load 14 ceases. In other words, L1 or L3 becomes inactive. The following paragraphs define operation of the management circuit 10 during a brownout condition. During a brownout condition, the management circuit 10 establishes an alternate electrical path between the AC power supply 12 and the load 14 to ensure continued working of the load 14.

Brownout Condition (L1 is Inactive, L2 and L3 are Active)

Figure 4:
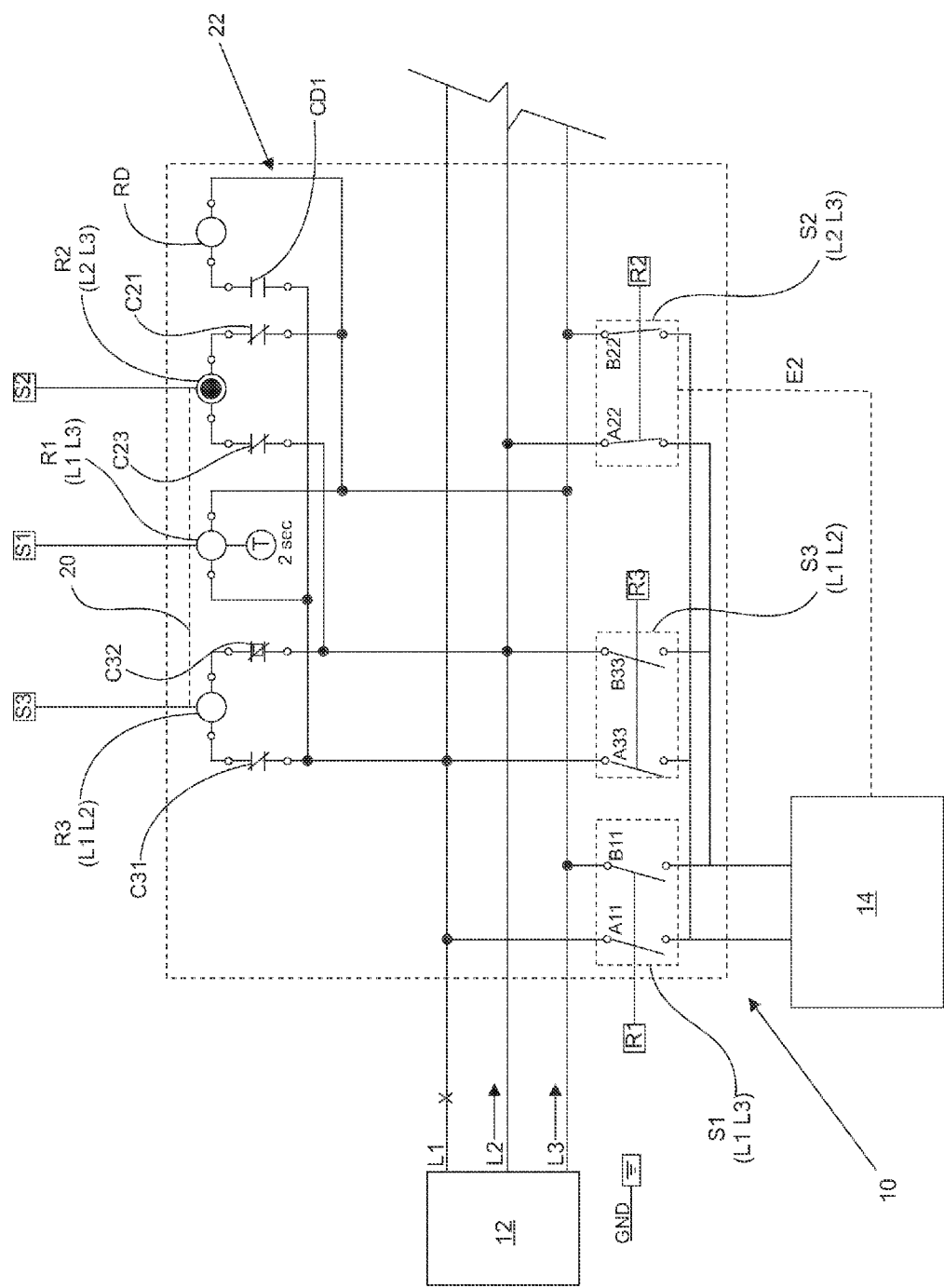
FIG. 4 is schematic electrical diagram of the management circuit of FIG. 2 illustrating status of the various electrical components thereof when current flow through the first hot conductor is lost.

As shown in FIG. 4, during a brownout condition, current flow through either L1 or L3 stops. FIG. 4 illustrates an instance where current flow through L1 stops. However, L3 and L2 are active. Since the load 14 is connected between L1 and L3, absence of current through L1 results in no voltage being supplied to the load 14. In such a situation, the management circuit 10 establishes an alternate electrical path E2 between the AC power supply 12 and the load 14 through switch S2. Operation of the management circuit 10 when L1 is inactive is as follows: Since L1 is inactive, relay R1 connected to L1 de-energizes thereby opening S1 causing the first electrical path E1 to open. Relay R3 which is also connected to L1 fails to energize. S3 controlled by R3, therefore, continues to remain open. Since relay R2 is connected to L2 and L3, both of which are active, R2 starts energizing. Energization of R2 causes A22 and B22 of S2 connected thereto to close thereby establishing an alternate electrical path E2 between the AC power supply 12 and the load 14. The alternate electrical path E2 ensures that normal voltage is supplied to the load 14 during the brownout condition caused by failure of L1.

Brownout Condition (L3 is Inactive, L2 and L1 are Active)

Figure 5:
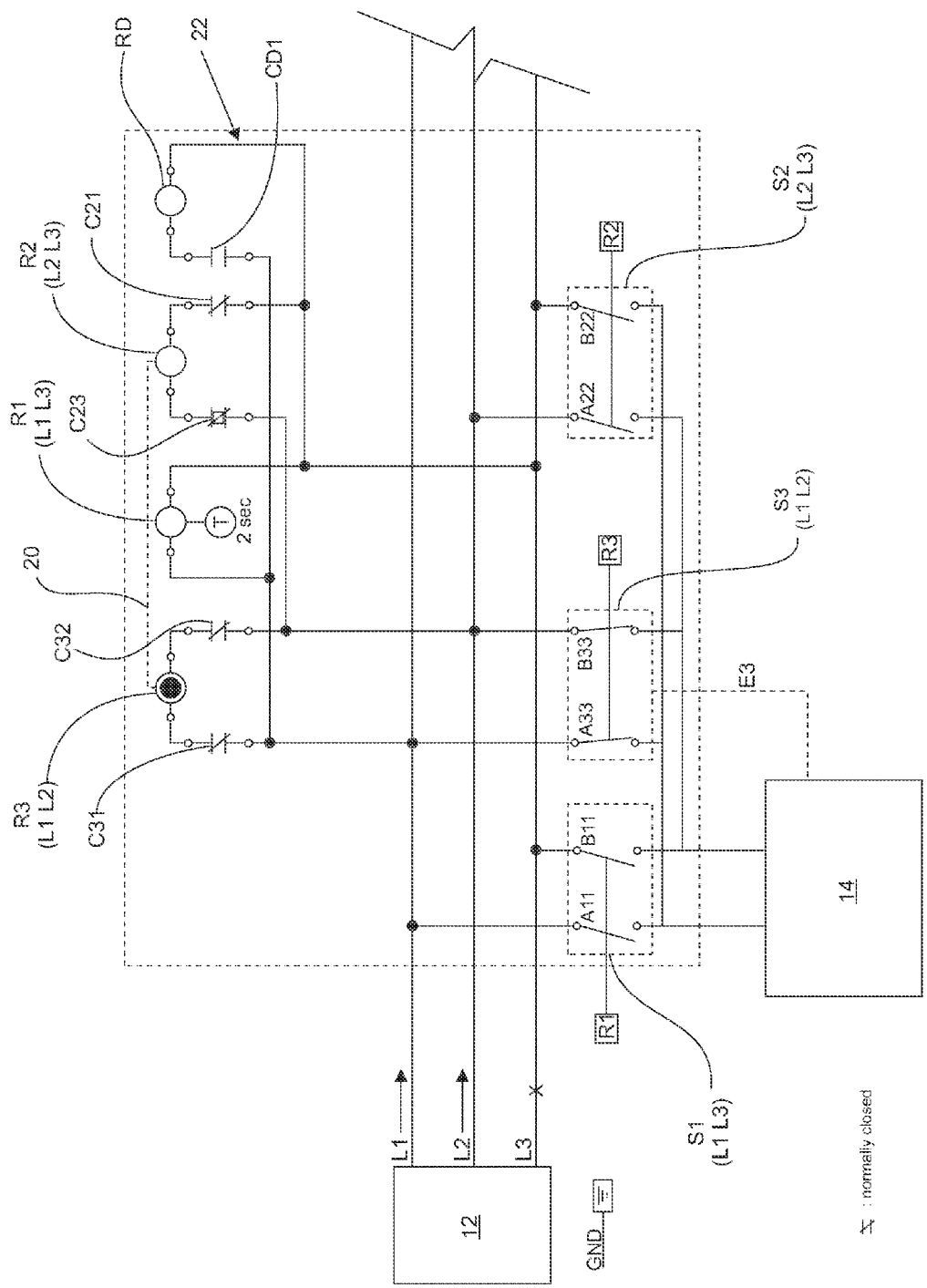
FIG. 5 is schematic electrical diagram of the management circuit of FIG. 2 illustrating status of the various electrical components when current flow through the third hot conductor is lost.

FIG. 5 illustrates an instance where current flow through L3 stops. However, L1 and L2 are active. Since the load 14 is connected between L1 and L3, absence of current through L3 also results in no voltage being supplied to the load 14. In such a situation, the management circuit 10 establishes an alternate electrical path E3 between the AC power supply 12 and the load 14 through S3. Operation of the management circuit 10 when L3 is inactive is as follows: Since L3 is inactive, relay R1 connected to L3 de-energizes thereby opening switch S1 causing the electrical path E1 to open. Relay R2 which also connected to L3 fails to energize. S2 controlled by R2, therefore, continues to remain open. Since relay R3 is connected to L1 and L2, both of which are active, only relay R3 starts energizing. Energization of R3 causes A33 and B33 of S3 connected thereto to close thereby establishing an alternate electrical path E3 between the power supply 12 and the load 14. The alternate electrical path E3 ensures that normal voltage is supplied to the load 14 during a brownout condition caused by failure of line L3.

It is evident from the foregoing paragraphs that power supply to load 14 is not interrupted during failure of either L1 or L3. The management circuit 10 ensures that during a brownout condition, the inactive hot conductor, either L1 or L3, is substituted with the active hot conductor L2.

Figure 6:
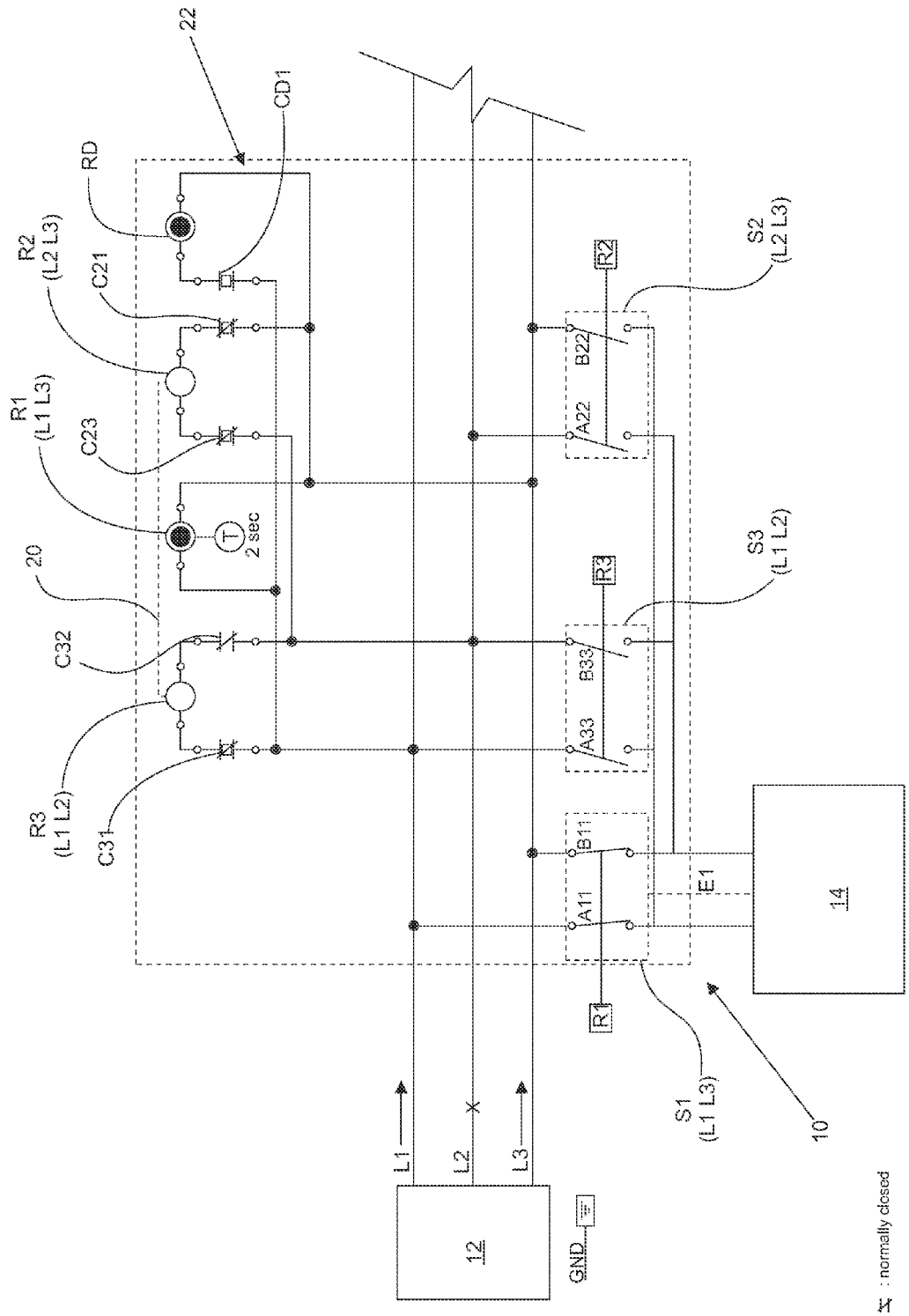
FIG. 6 is schematic electrical diagram of the management circuit of FIG. 2 illustrating status of the various electrical components when current flow through the second hot conductor is lost.

Loss of current on L2 does not affect operation of load 14 as load 14 is not connected thereto and is connected between L1 and L3. FIG. 6 illustrates the status of the electronic components when L2 fails or is inactive. Current supply to the load 14 is supplied through closed switches A11 and B11 of S1 which in turn is controlled by R1. Current flow in L1 and L3 connected to R1 causes energization of R1. Switching of R2 and R3 is prevented by the interlocking means 20.

After the brownout condition has passed, current supply resumes in L1 or L3 and the management circuit 10 restores normal operation. In other words, either S2 or S3 opens or switches OFF and S1 switches back ON or closes due to energization of R1. As described earlier, R1 maintains its energized state because of the interlock 20. In embodiments where R1 is connected to A11 and B11 through the delay circuit 22, energization of R1 causes activation of the delay circuit 20. Energization of R1 causes energization of RD which in turn closes CD1. As A11 and B11 are connected to the delay circuit 22, closing of R1 does not instantaneously result in closing of A11 and B11.

The truth table illustrated in FIG. 7 shows activation of switching modules S1, S2 and S3 based on presence or absence of current in L1, L2 and L3. When L1 is 1 (active) and L3 is 1 (active), switching module S1 is energized (indicated by 1) for powering the load 14. When L1 is 0 (inactive) and L3 is 1 (active), switching module S2 is energized i.e. is 1 for forming an alternate electrical path E2 between load 14 and active L3 and L2. When L1 is 1 (active) and L3 is 0 (inactive), switching module S3 is energized i.e.

is 1 for forming another alternate electrical path E3 between load 14 and active L1 and L2. When L2 is 0 (inactive) and L1 and L3 are 1 (active), normal operation continues and current flows through electrical path E1. In other words, the management circuit 10 is inactive and does not perform any switching operation.

The following paragraph describes some of the variations or modifications contemplated by the inventors with regard to the power management circuit 10 described herein.

As stated earlier, the management circuit may be incorporated in an AC power supply system wherein the single phase load is connected between a hot conductor and a neutral or cold conductor of the AC power supply system. A person skilled in the art will understand that this implementation may result in reduced number of relays and switching modules.

Figure 8:
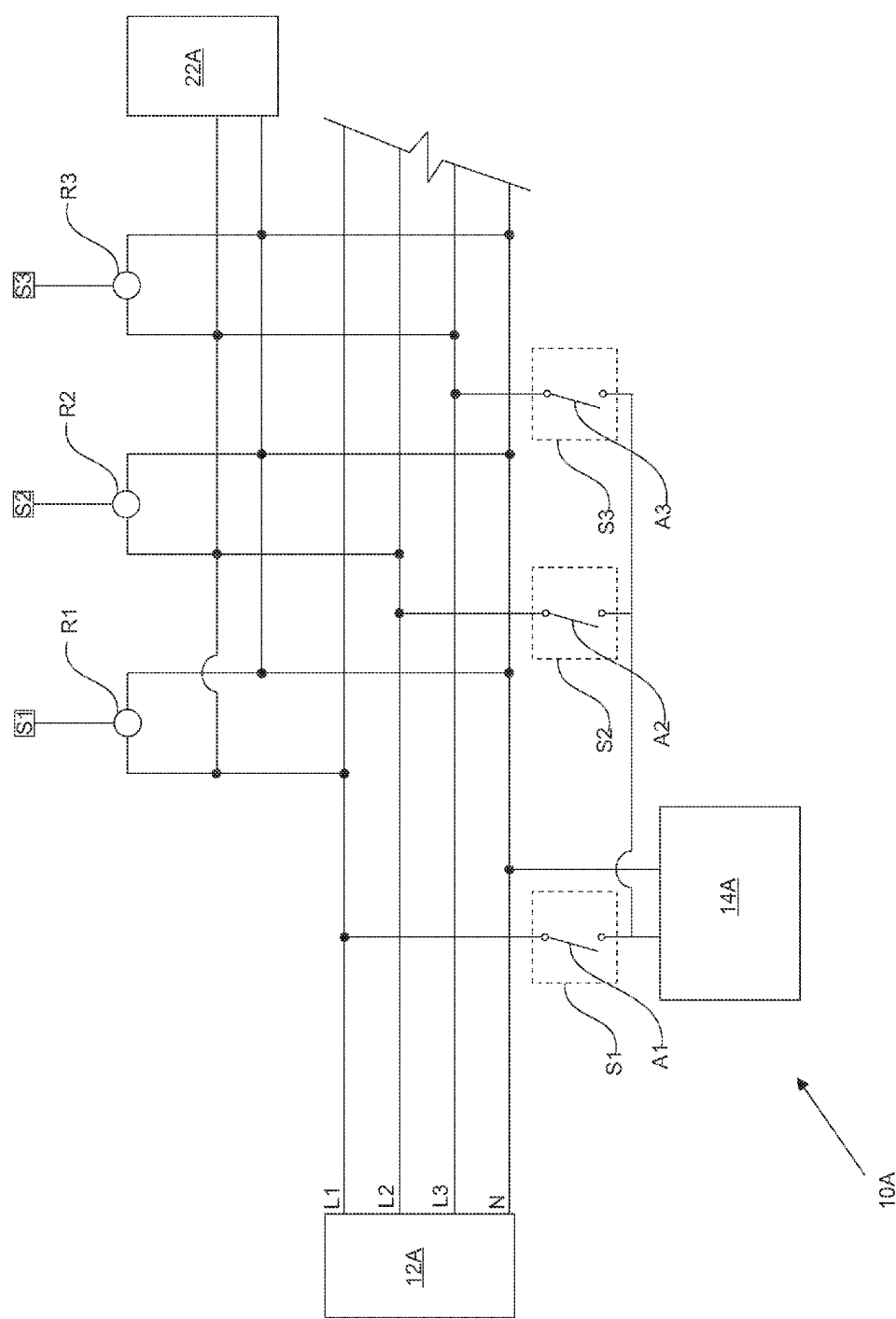
FIG. 8 is an electrical diagram illustrating an alternative embodiment, herein a power management circuit is connected between a three phase AC power supply and a single phase electrical load which is normally connected between a first hot conductor and a cold conductor of the AC power supply.

FIG. 8 illustrates an electrical diagram illustrating arrangement of a power management circuit 10A between a three phase AC power supply 12A and a single phase load 14A wherein the load 14A is connected between hot conductor L1 and cold conductor N of the AC power supply 12A. The AC power supply 12A also powers a three phase load 16A. The AC power supply 12A shown in FIG. 8 comprises three hot conductors and a cold conductor. However, a person of skill will understand that the AC power supply 12A may comprise two hot conductors and a cold conductor. As in the case of the power management circuit 10 illustrated in FIGS. 1 to 7, the principle remains the same. The power management circuit 10A senses a change in condition in the hot conductor L1 connected to the load 14A. In case of a change, which may be loss of current in L1 the power management circuit 10A switches the load 14A to between the connected neutral conductor N and one of the remaining active hot conductors, either L2 or L3, of the AC power supply 12A. As shown in FIG. 9, the management circuit 10A comprises three load switching modules S1, S2 and S3 controlled by relays R1, R2 and R3, respectively. S1 is connected between the load 14A and L1 and N. S2 is connected between the load 14A and L2 and N. S3 is connected between the load 14A and L3 and N. If current is not available in L1 then the management circuit 10A closes or switches ON either S2 or S3 to enable powering of the load 14A through N and either L2 or L3. In order to prevent simultaneous opening and closing of S1, S2 or S3, the management circuit 10A may be provided with an interlock system as contemplated for the embodiment illustrated in FIGS. 1 to 7. Also, as with the power management circuit 10 illustrated in FIGS. 1 to 7, the management circuit 10A of this embodiment may also be associated with a delay circuit 22A which is similar in construction and operation to the delay circuit 22.

The management circuit 10 may be used to affect switching if there is no current supply only on one particular hot conductor connected to the load. For example, if the load is connected between hot conductors L1 and L3, the management circuit 10 may be configured to affect switching only if there is no current supply on L1. No action will be taken if there is no current supply through L3. In the embodiments described herein, the management circuit 10 switches the load if there is no current supply either on L1 or L3. A person in skill in the art understands that if the absence of current supply in only hot conductor is taken into effect, only two relays and two load switching modules are needed.

The management circuit 10 may also be configured to carry out switching instantaneously. In other words, the management circuit 10 need not contain a delay circuit.

The management circuit 10 may be used to affect switching during overload conditions. The management circuit may contain or be associated with a current sensor which continuously monitors the current in L1, L2 or L3. At a given instance, if the current in any one of L1, L2 or L3, to which the single phase electrical bad 14 is connected, is over a preset threshold current, the management circuit will switch to connect the bad 14 between hot conductors carrying currents below the preset threshold.

The invention claimed is:

1. A power management circuit connected between a three phase alternating current (AC) power supply having at least three conductors and a single phase electrical load connected across two of the at least three conductors, the two conductors establishing a first electrical path between the AC power supply and the single phase electrical load, the management circuit comprising:
   a first load switching module connected between the single phase electrical load and a first and a third conductor;
   a second load switching module connected between the single phase electrical load and the third and a second conductor;
   a third load switching module connected between the single phase electrical load and the first and the second conductor; and
   a control module operatively coupled to the first, second and third load switching module and to the first, second and third conductors;
   wherein the control module is sensitive to a change in a condition in any one of the first, second and third conductors and energizes the single phase electrical load by establishing an alternate electrical path between the AC power supply and any other of the first, second or third conductors through the respective first, second or third load switching modules.

2. The management circuit of claim 1, wherein the change in condition is a loss of current on the first, second or third conductors.

3. The management circuit of claim 1, wherein the change in condition is a current greater than a preset threshold current flowing through the first, second or third conductors.

4. The management circuit of claim 1, wherein the first, second and third conductors are high voltage conductors and the single phase electrical load is connected across the first and third high voltage conductors.

5. The management circuit of claim 1, wherein the first and second conductors are high voltage conductors and the third conductor is a neutral conductor and the single phase electrical load is connected across the first and third conductors.

6. The management circuit of claim 4, wherein the control module comprises three relays, a first relay connected to the first and third conductors and to the first load switching module, a second relay connected to the third and second conductors and to the second load switching module, a third relay connected to the first and second conductors and to the third load switching module, wherein
   if there is current flow in the first, second and third conductors, the first relay is activated to close the first load switching module and open the second and third load switching modules to energize the single phase electrical load through the first load switching module;
   if there is current flow in the third and second conductors and no current flow in the first conductor, the first relay being de-activated to open the first load switching module, the third load switching module remaining open, the second relay being activated to close the second load switching module to energize the single phase electrical load through the second load switching module; and if there is current flow in the first and second conductors and no current flow in the third conductor, the first relay being de-activated to open the first load switching module, the second load switching module remaining open, the third relay being activated to close the third load switching module to energize the single phase electrical load through the third load switching module.

7. The management circuit of claim 6 further comprising an interlock associated with the control module, to prevent simultaneous operation of the first, second and third relays.

8. The management circuit of claim 7, wherein each of the second and third relays comprises two normally closed contacts, at least one of the normally closed contact of each of the second and third relays being controlled by the first relay.

9. The management circuit of claim 6 further comprising a delay circuit having a prescribed delay time connected to the first relay to delay activation of the first load switching module.

10. The management circuit of claim 9, wherein the delay circuit is an electronic delay circuit and prescribed delay time is about 1 second to about 3 seconds.

11. The management circuit of claim 9, wherein the delay circuit is an electro-mechanical delay circuit and prescribed delay time is 2 seconds.

12. The management circuit of claim 1, wherein the each load switching module comprises two normally open switches, one for connecting each conductor to the single phase electrical load.

13. A power management circuit connected between an alternating current (AC) power supply and a single phase electrical load, the management circuit comprising:

a first relay connected to a first hot conductor and a third hot conductor of the AC power supply and to the single phase electrical load through a first load switching module;

a second relay connected to the third hot conductor and a second hot conductor of the AC power supply and to the single phase electrical load through a second load switching module;

a third relay connected to the first hot conductor and the second hot conductor and to the single phase electrical load through a third load switching module;

the first relay electrically coupled to a first normally closed relay contact associated with each of the second and third relays;

the second relay electrically coupled to a second normally closed relay contact associated with the third relay;

the third relay electrically coupled to a second normally closed relay contact associated with the second relay;

wherein during operation if there is current flow in the first, second and third hot conductors, the first relay being activated to close the first load switching module, the first normally closed relay contacts of the second and third relays being opened to open the second and third load switching modules for establishing a first electrical path to the single phase electrical load through the first load switching module;

if there is no current flow in the first hot conductor and there is current flow in the third and second hot conductors, the second relay being activated to close the second load switching module and establish a second electrical path to the electrical load through the second load switching module, absence of current flow in the third hot conductor failing to activate the first and third relays connected to the third hot conductor; and if there is no current flow in the third hot conductor and there is current flow in the first and second hot conductors, the third relay being activated to close the third load switching module and establish a third electrical path to the electrical load through the third load switching module, absence of current flow in the first hot conductor failing to activate the first and second relays connected to the first hot conductor.

* * * * *